United States Patent [19]

O'Neal

[11] 4,045,925
[45] Sept. 6, 1977

[54] INFLATABLE DOCK SEAL AND MOUNTING THEREFOR

[76] Inventor: Larry O'Neal, 4953 Timbercrest Drive, Canfield, Ohio 44406

[21] Appl. No.: 681,796

[22] Filed: Apr. 30, 1976

[51] Int. Cl.² .................................................. E04B 1/345
[52] U.S. Cl. ..................................... 52/2; 52/173 DS; 52/619
[58] Field of Search .............. 52/2, 173 DS, 237, 619; 49/498, 477

[56] References Cited

U.S. PATENT DOCUMENTS

| | | | |
|---|---|---|---|
| 511,472 | 12/1893 | Sumovski | 52/2 |
| 2,935,771 | 5/1960 | Hatcher | 49/498 |
| 2,939,467 | 6/1960 | Meyer et al. | 52/2 |
| 3,175,519 | 3/1965 | Warheit | 49/498 |
| 3,391,502 | 7/1968 | O'Neal | 52/2 |
| 3,391,503 | 7/1968 | O'Neal | 52/2 |
| 3,714,745 | 2/1973 | O'Neal | 52/2 |
| 3,854,253 | 12/1974 | Slowbe | 52/2 |
| 3,939,614 | 2/1976 | Frommelt et al. | 52/2 |

Primary Examiner—Price C. Faw, Jr.
Assistant Examiner—Robert C. Farber
Attorney, Agent, or Firm—Webster B. Harpman

[57] ABSTRACT

An inflatable dock seal for closing the area around a dock opening in a wall with respect to a truck or a trailer has an upper horizontal section and a pair of vertical sections in communication therewith. Elongated uninflated flexible tubular members on each of the vertical sections are slidably engaged over structural members secured to the wall and spaced flexible longitudinal flanges on the upper horizontal section are clampingly secured between distortable clamping members on a mounting strip on the wall.

5 Claims, 4 Drawing Figures

INFLATABLE DOCK SEAL AND MOUNTING THEREFOR

BACKGROUND OF THE INVENTION

1. Field of the Invention

This invention relates to inflatable dock seals for closing a dock opening in a wall of a building with respect to a truck or a trailer positioned adjacent thereto.

2. Description of the Prior Art

Prior structures of this type are usually mounted on or in an opening in a building against which a truck or a trailer is to be positioned so as to seal the same with respect thereto. (See U.S. Pat. Nos. 3,634,589, 2,939,467, 3,303,614, 3,391,502, 3,391,503 and 3,714,745.)

This invention discloses an inflatable dock seal and an improved construction incorporated therewith for mounting the same quickly and easily as compared with the constructions heretofore known in the art.

SUMMARY OF THE INVENTION

An inflatable dock seal comprises an inverted U-shaped inflatable member positioned around a dock opening in a building wall so as to seal a truck or a trailer body with respect thereto. An upper horizontal section extends across the top of the opening and a pair of vertical inflatable sections in communication therewith are positioned at the sides of the dock opening. Fastening devices including elongated channel-like members on each of the inflatable members are engaged on rigid structural members which are in turn attached to the building wall. One of the fastening devices may comprise a mounting strip positioned across the opening having a peripheral frame of distortable clamping members arranged thereon to distortable clampingly receive and retain the fastening devices on the upper horizontal inflatable section which may be modified to form elongated flanges. The mounting strip is secured to the building wall. Installation of the inflatable dock seal is quickly and easily achieved by securing the mounting strip to the building wall above the opening, hanging the uninflated dock seal thereon by means of a pin therein, sliding the structural members into the elongated channel-like members on the inflatable sections and engaging the upper ends of the structural members in recesses in the bottom of the mounting strip and then securing the lower ends of the structural members to the building wall and then engaging the fastening devices on the flanges of the upper horizontal inflatable section.

DESCRIPTION OF THE PREFERRED EMBODIMENT

Figure 1:
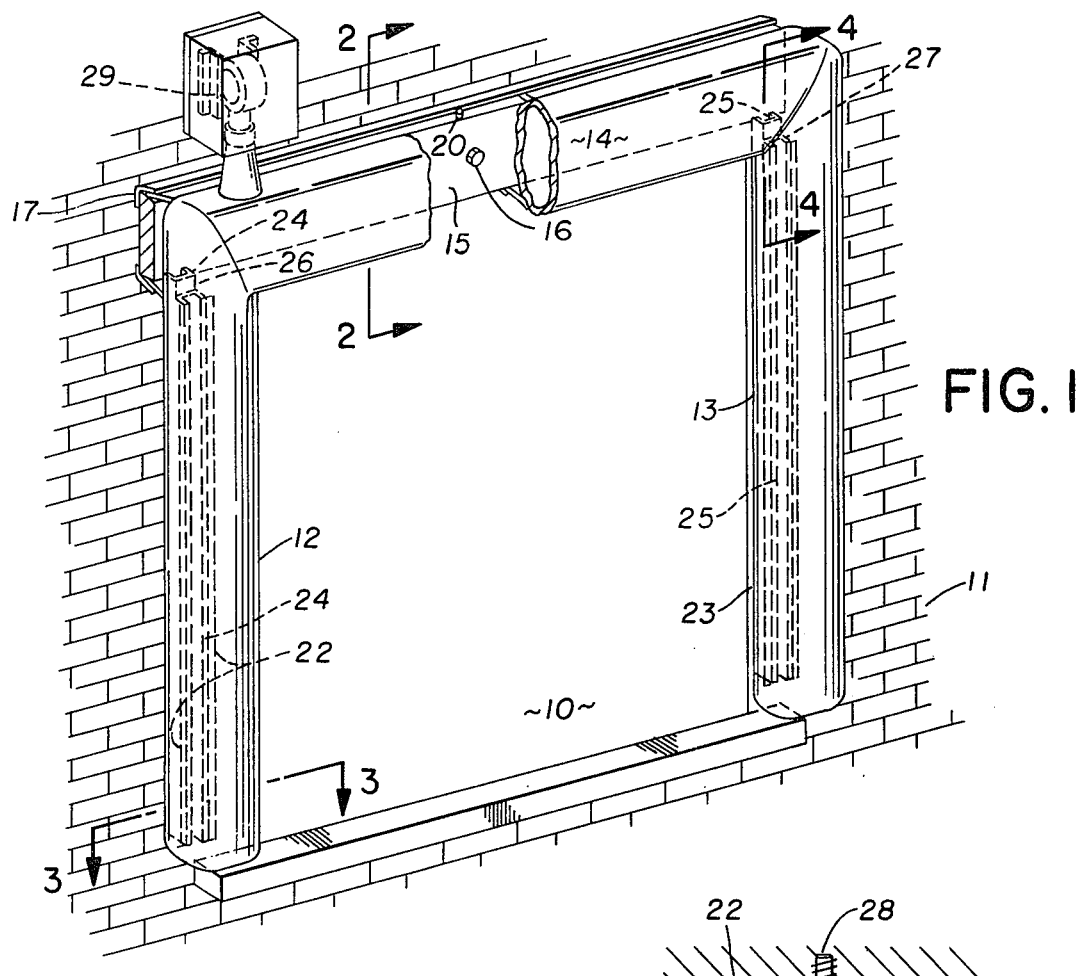
FIG. 1 is a perspective elevation of the inflatable dock seal with parts broken away and parts illustrated in broken lines.
Figure 2:
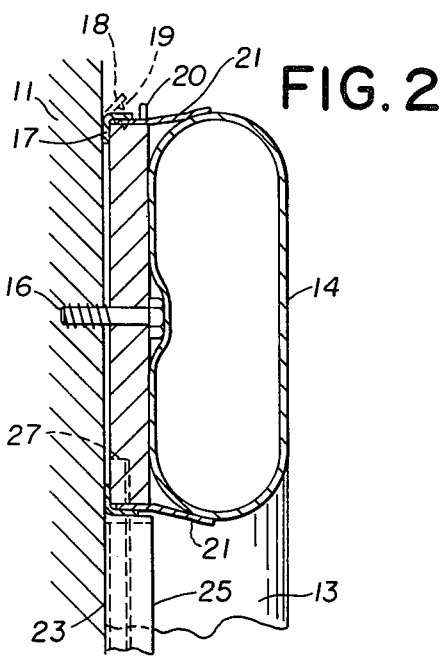
FIG. 2 is an enlarged cross section on line 2—2 of FIG. 1 with broken lines indicating the open position of the distortable clamping frame.

By referring to the drawings and FIG. 1 in particular it will be seen that a loading dock opening 10 is located in a building wall 11 and provided with a pair of vertical inflatable members 12 and 13 at the sides thereof together with a horizontally disposed inflatable member 14 across the top thereof. A mounting strip 15 such as a 2 × 10 is fastened to the building 11 by several bolts 16 and is provided with a peripheral frame 17 which has a distortable angularly disposed flange 18 thereon as best illustrated in FIG. 2 of the drawings.

By referring thereto it will be seen that the angular distortable flange 18 has a plurality of points 19 therealong. A pin 20 is also positioned on the mounting strip 15 preferably centrally thereof as seen in FIG. 1 of the drawings. The upper horizontal inflatable member 14 has a pair of vertically spaced longitudinally extending flexible flanges 21 thereon; or alternately a flexible tubular member.

Figure 3:
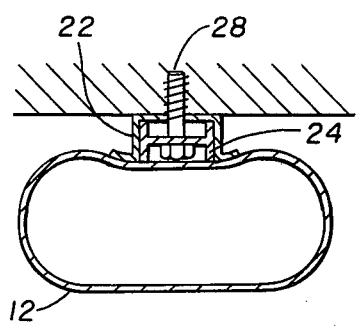
FIG. 3 is an enlarged horizontal section on line 3—3 of FIG. 1.
Figure 4:
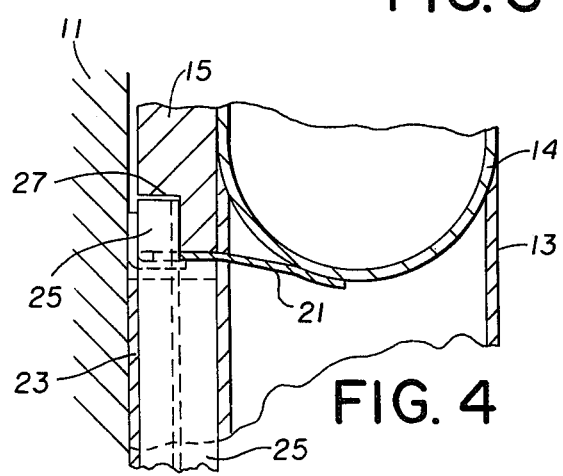
FIG. 4 is an enlarged vertical detail on line 4—4 of FIG. 1.

By referring now to FIGS. 1 and 3 of the drawings, it will be seen that the vertical inflatable members 12 and 13 have longitudinally extending channel-like open ended hollow pockets 22 and 23 thereon in which a pair of structural members 24 and 25 are slidably positioned. The upper ends of the structural members 24 and 25 are shaped to fit within recesses 26 and 27 in the lower opposite corners of the mounting strip 15 and are thereby held against the force of the wall 11. The lower ends of each of the structural members 24 and 25 are bolted to the wall 11 as by bolts 28 as seen in FIG. 3 of the drawings.

It will thus be seen that the inflatable dock seal and its novel mounting are easily and quickly installed by first mounting the mounting strip 15 above the opening 10, hanging the assembled but uninflated dock seal thereon by engagement with the pin 20, sliding the structural members 24 and 25 upwardly within the elongated pockets 22 and 23 on the members 12 and 13, locating the upper ends of the structural members 24 and 25 in the recesses 26 and 27 in the mounting strip 15 and bolting the lower ends of these structural members to the wall by the bolts 28. The spaced longitudinal flexible flanges 21 on the horizontal inflatable member 14 are then positioned between the edges of the mounting strip 15 and the distortable flanges 18 of the clamping frame 17, with their points 19 moved downwardly into clamping engagement thereagainst and the installation is completed whereupon a blower 29 is installed, placed in communication with one of the inflatable members and energized to inflate the same.

It will thus be seen that an inflatable dock seal and a mounting therefor has been disclosed which completely eliminates the heretofore difficult and time consuming installation of comparable inflatable dock seals.

Although but two embodiments of the present invention has been illustrated and described, it will be apparent to those skilled in the art that various changes and modifications may be made therein without departing from the spirit of the invention and having thus described my invention what I claim is:

1. An inflatable dock seal and mounting therefor for positioning said dock seal on a wall above and beside a dock opening therein and comprising at least one inflatable member arranged in an inverted U-shape and having an upper horizontal section and a pair of spaced vertical sections, flexible noninflatable longitudinally positioned channel-like fastening members on the exterior of at least two of said sections, said fastening members each being integral and U-shaped with the open side facing toward a corresponding vertical section and having attached flanges on each leg thereof, said flanges being attached to said corresponding vertical section to close said fastening member, said fastening members each having an open end, rigid elongated structural members each slidably received therein through said open end to be positioned one in each of said channel-like fastening members, said structural members being attached to said wall through said fastening members beside said dock opening to hold said sections of said inflatable member thereagainst via said fastening members, and means for inflating said inflatable member.

2. The inflatable dock seal set forth in claim 1 and wherein said longitudinally extending channel-like fastening members are attached to said spaced vertical sections of said inflatable member and a mounting strip having at least one continuous distortable clamping device thereon is attached to said wall above said dock opening therein, said distortable clamping device engaged on said fastening member on said upper horizontal section on said inflatable member.

3. The inflatable dock seal and mounting set forth in claim 2 and wherein said clamping device is a distortable angle member, and wherein a plurality of sharp points are located on said angle member so as to engage and hold material positioned in said angle member when the same is distorted.

4. The inflatable dock seal and mounting set forth in claim 2 and wherein the clamping device is a distortable angle member positioned about the mounting strip to form a peripheral flange and wherein there are vertically extending fastening members on the ends of said upper horizontal section of said inflatable member.

5. The inflatable dock seal and mounting set forth in claim 1 and wherein said elongated structural members are H-shaped in cross section and of smaller configuration at their uppermost ends and engaged in registering configurations in said mounting strip.

* * * * *